(12) United States Patent
Peinemann et al.

(10) Patent No.: US 10,549,243 B2
(45) Date of Patent: Feb. 4, 2020

(54) POLYSTYRENE-B-POLYETHYLENE OXIDE BLOCK COPOLYMER MEMBRANES, METHODS OF MAKING, AND METHODS OF USE

(71) Applicant: KING ABDULLAH UNIVERSITY OF SCIENCE AND TECHNOLOGY, Thuwal (SA)

(72) Inventors: Klaus-Viktor Peinemann, Thuwal (SA); Madhavan Karunakaran, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 633 days.

(21) Appl. No.: 15/027,864

(22) PCT Filed: Oct. 7, 2014

(86) PCT No.: PCT/IB2014/002300
§ 371 (c)(1),
(2) Date: Apr. 7, 2016

(87) PCT Pub. No.: WO2015/052579
PCT Pub. Date: Apr. 16, 2015

(65) Prior Publication Data
US 2016/0250600 A1     Sep. 1, 2016

Related U.S. Application Data

(60) Provisional application No. 61/888,114, filed on Oct. 8, 2013.

(51) Int. Cl.
*B01D 67/00* (2006.01)
*B01D 69/02* (2006.01)
(Continued)

(52) U.S. Cl.
CPC ...... *B01D 67/0013* (2013.01); *B01D 67/0011* (2013.01); *B01D 69/02* (2013.01);
(Continued)

(58) Field of Classification Search
CPC .... B01D 67/0013; B01D 71/80; B01D 71/28; B01D 71/52; B01D 69/02; B01D 67/0011; B01D 2325/022; B01D 2323/12
(Continued)

(56) References Cited

U.S. PATENT DOCUMENTS

2004/0050791 A1*   3/2004   Herczeg ............... B01D 61/145
                                                                  210/651

FOREIGN PATENT DOCUMENTS

DE         102012207344 A1    11/2013

OTHER PUBLICATIONS

Janina Hahn et al: "Structure formation of integral-asymmetric membranes of polystyrene-block-Poly (ethylene oxide)", Journal of Polymer Science Part B: Polymer Physics, vol. 51, No. 4, Feb. 15, 2013 (Feb. 15, 2013), pp. 281-290, XP055162817, ISSN: 0887-6266, DOI: 10.1002/polb.23209.

(Continued)

*Primary Examiner* — Vishal V Vasisth
(74) *Attorney, Agent, or Firm* — Billion & Armitage; Gregory S. Schwartz

(57) ABSTRACT

Embodiments of the present disclosure provide for polystyrene-b-polyethylene oxide (PS-b-PEO) block copolymer nanoporous membranes, methods of making a PS-b-PEO block copolymer nanoporous membrane, methods of using PS-b-PEO block copolymer nanoporous membranes, and the like.

17 Claims, 4 Drawing Sheets

(51) Int. Cl.
*B01D 71/28* (2006.01)
*B01D 71/52* (2006.01)
*B01D 71/80* (2006.01)

(52) U.S. Cl.
CPC ............. *B01D 71/28* (2013.01); *B01D 71/52* (2013.01); *B01D 71/80* (2013.01); *B01D 2323/12* (2013.01); *B01D 2325/022* (2013.01)

(58) Field of Classification Search
USPC .................................................. 210/500.23
See application file for complete search history.

(56) References Cited

OTHER PUBLICATIONS

Huiming Mao et al: "Control of pore hydrophilicity in ordered nanoporous polystyrene using an AB/AC block copolymer blending strategy". Faraday Discussions, vol. 128, Jan. 1, 2005 (Jan. 1, 2005). p. 149. XP055162821. ISSN: 1359-6640, DOI: 10.1039/b403217a.

Huiming Mao et al: "Macroscopic samples of polystyrene with ordered three-dimensional nanochannels". Soft Matter, vol. 2, No. 1, Jan. 1, 2006 (Jan. 1, 2006) • p. 57, XP055162824, ISSN: 1744-683X, DOI: 10.1039/b513958a.

Xianfeng Li et al: "Ordered nanoporous membranes based on diblock copolymers with high chemical stability and tunable separation properties". Journal of Materials Chemistry. vol. 20, No. 21, Jan. 1, 2010 (Jan. 1, 2010), p. 4333, XP055162813, ISSN: 0959-9428, DOI: 10.1039/b926774c.

Madhavan Karunakaran et al: "Isoporous PS-b-PEO ultrafiltration membranes via self-assembly and water-induced phase separation", Journal of Membrane Science, vol. 453, Nov. 16, 2013 (Nov. 16, 2013), pp. 471-477, XP055163000, ISSN: 0376-7388, DOI: 10.1016/j.memsci.2013.11.015.

Hahn J et al: "Structure Formation of Integral-asymmetric Membranes of Polystyrene-block-poly(Ethylene Oxide)", Procedia Engineering, vol. 44, 2012, pp. 1844-1847, XP028515725, ISSN: 1877-7058, DOI: 10.1016/J.PROENG.2012.08.972 [retrieved on Nov. 8, 2012].

International Search Report and Written Opinion of Application No. PCT/IB2014/002300 dated Feb. 9, 2015.

* cited by examiner

POLYSTYRENE-B-POLYETHYLENE OXIDE BLOCK COPOLYMER MEMBRANES, METHODS OF MAKING, AND METHODS OF USE

CROSS-REFERENCE TO RELATED APPLICATIONS

This application is the National Stage of International Application No. PCT/IB2014/002300, filed 7 Oct. 2014, having the title "POLYSTYRENE-B-POLYETHYLENE OXIDE BLOCK COPOLYMER MEMBRANES, METHODS OF MAKING, AND METHODS OF USE" which claims the benefit of and priority to U.S. Provisional Application entitled "POLYSTYRENE-B-POLYETHYLENE OXIDE BLOCK COPOLYMER MEMBRANES, METHODS OF MAKING, AND METHODS OF USE," having Ser. No. 61/888,114, filed on 8 Oct. 2013, the contents of all of which are incorporated by reference as if fully set forth herein.

BACKGROUND

In general, porous membranes can be prepared using non-solvent induced phase inversion (NIPS) techniques. However, a common problem associated with NIPS is irregular pore size, which is the main factor controlling the separation performance of membranes. Thus, commercial membranes tend to have either a high flux or low retention of solute particles or vice versa. Consequently, there is a need to overcome current deficiencies.

SUMMARY

Embodiments of the present disclosure provide for polystyrene-b-polyethylene oxide (PS-b-PEO) block copolymer nanoporous membranes, methods of making a PS-b-PEO block copolymer nanoporous membrane, methods of using PS-b-PEO block copolymer nanoporous membranes, and the like.

An embodiment of the structure, among others, includes: a porous membrane made of polystyrene-b-polyethylene oxide (PS-b-PEO) copolymers having a polydispersity of about 1 to 1.2, wherein the porous membrane has periodically ordered pores formed by ordered cylindrical structures and has a long axis perpendicular to the surface.

An embodiment of the method of making a porous membrane, among others, includes: dissolving a PS-b-PEO copolymer in a water miscible liquid to produce a casting solution; casting the casting solution on a substrate to form a film; allowing the film to evaporate for a first period of time; and immersing the film into a water bath for a second period of time to form the porous membrane.

In any one or more aspects of the aforementioned method the evaporation time prior to immersion in water can be about 1 and 60 seconds. The casting solution can include one or more of the following: dimethylacetamide, dimethylformamide, N-methylpyrrolidone, dimethylsulfoxide, tetrahydrothiophene sulfone, dioxane, tetrahydrofurane, or a mixture thereof. The PS-b-PEO copolymer concentration in the casting solution can be about 10 to 30 wt. %. The first period of time can be about 5 to 20 seconds. The second period of time can be about 30 min to 24 hours.

In any one or more aspects of the aforementioned embodiments, the porous membrane can be an integral asymmetric membrane. The porous membrane can be selected from the following: a flat sheet porous membrane, a tubular porous membrane, or a hollow fiber porous membrane. The porous membrane can have a surface pore density of about $10^8$ pores/cm$^2$ or more. The surface pores can have a diameter of about 50 nm or less. The porous membrane can have a ratio of the maximum diameter $d_{max}$ to the minimum pore diameter $d_{min}$ of 2 or less. The PS-b-PEO copolymer can have a molecular weight of about 100 to 250 kDalton. The PS-b-PEO copolymer can have a polyethylene oxide content of about 8 to 25 wt. %.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Discussion

Figure 1:
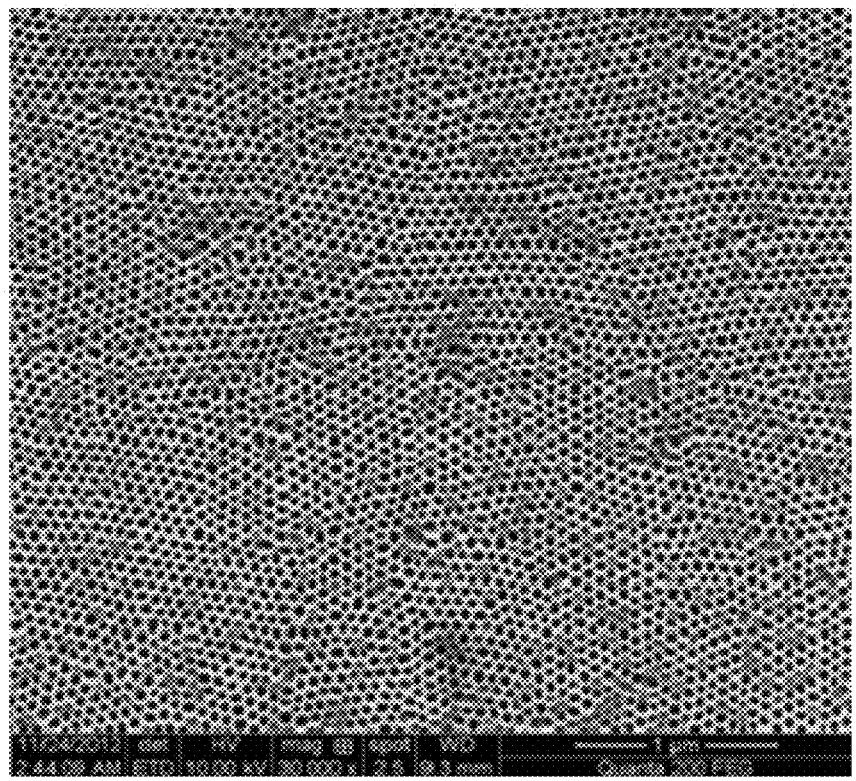
FIG. 1 is a SEM image of copolymer membrane (Top surface).

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic organic chemistry, polymer chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion

Embodiments of the present disclosure provide for polystyrene-b-polyethylene oxide (PS-b-PEO) block copolymer nanoporous membranes, methods of making a PS-b-PEO block copolymer nanoporous membrane, methods of using PS-b-PEO block copolymer nanoporous membrane, and the like. In an embodiment, the PS-b-PEO block copolymer nanoporous membrane can have well ordered nano-sized pores in the membrane, which provides high selectivity and high flux.

Another advantage of embodiments of the present disclosure include use of water as the phase inversion medium, which allows for production of the PS-b-PEO block copolymer nanoporous membrane using large scale techniques. In addition, embodiments of the present disclosure are stable in water for more than a week, which is advantageous in separation processes.

A method for production of polystyrene-b-polyethyfene oxide (PS-b-PEO) block copolymer nanoporous membrane by block copolymer (BCP) self assembly followed by a non-solvent induced phase inversion (NIPS) technique is described below, Self assembly of BCP can be tailored by appropriate use of solvents. Solvent type, solvent composition, block type, and block length play a role in the self assembly of block copolymer. A challenge is the selection of the casting solution, identification of most convenient block copolymer, and right additives for the isoporous membrane generation. By choosing a suitable block copolymer and appropriate solvent composition a highly ordered nanoporous asymmetric membrane by the NIPS technique can be produced and is described herein.

An embodiment of the present disclosure includes a structure having a porous membrane made of PS-b-PEO copolymers. In an embodiment, the porous membrane has periodically ordered pores formed by ordered cylindrical structures and has a long axis perpendicular to the surface. In an embodiment, the porous membrane is an integral asymmetric membrane.

In an embodiment, the porous membrane can have a structure that follows the contours of the substrate used to form the porous membrane. In an embodiment, the porous membrane can have a structure of one of the following: a flat sheet porous membrane, a tubular porous membrane, a hollow fiber porous membrane, a curved porous membrane (e.g., concave (with respect to the substrate) porous membrane, convex porous membrane, etc.), or the like.

Now having described the porous membrane in general, various characteristics of the porous membrane are now described. In an embodiment, the porous membrane can have a polydispersity of about 1 to 1.3 or about 1 to 1.2. In an embodiment, the porous membrane can have a surface pore density of about $10^7$ pores/cm$^2$ or about $10^8$ pores/cm$^2$ or more (e.g. about $10^7$ to $10^{10}$ pores/cm$^2$ or about $10^7$ to $10^{12}$ pores/cm$^2$).

In an embodiment, the porous membrane surface pores can have a diameter of about 100 nm or less or about 50 nm or less (e.g., about 2 nm to 100 nm or about 2 nm to 50 nm). In an embodiment, the porous membrane can have a ratio of the maximum diameter $d_{max}$ to the minimum pore diameter $d_{min}$ of about 2 or less or about 1.5 or less (e.g., about 0.1 to 2, about 0.5 to 2, about 1 to 2, about 0.1 to 1.5, about 0.5 to 1.5, or about 1 to 1.5). In an embodiment, the pore can extend the thickness of the porous membrane or two pores can intersect, where one of the pores extends the thickness of the porous membrane. In an embodiment, each pore can be about 10 nm to 200 nm in length.

In an embodiment, the dimensions of the porous membrane can be designed for a specific design application. As a result, the specific dimensions can be adjusted as needed for the specific design application. In general, the porous membrane can have a thickness of about 10 μm to 100 μm.

Now having discussed the porous membrane, details regarding methods of making the porous membrane are now described. In an embodiment, the porous membrane can be prepared by dissolving a PS-b-PEO copolymer in a water miscible liquid to produce a casting solution. Next the casting solution is cast on a substrate to form a film. The film is allowed to evaporate for a first period of time. Subsequently, the film is immersed into a water bath for a second period of time to solidify the porous membrane. Variables such as casting solution, method of casting, composition of the PS-b-PEO copolymer, evaporation time, immersion time, and the like, can be adjusted to produce porous membranes having different characteristics. In this way, the porous membrane can be designed for particular purposes or applications.

In an embodiment, the PS-b-PEO copolymer can have a molecular weight of about 80 to 300 kDalton or about 100 and 250 kDalton. In an embodiment, the PS-b-PEO copolymer can have a polyethylene oxide content of about 5 to 30 or about 8 and 25 wt. %. In an embodiment, the PS-b-PEO copolymer can be about 10 to 30 or about 15 to 25 weight % of the casting solution.

In an embodiment, the casting solution can include one or more of the following components: dimethylacetamide, dimethylformamide, N-methylpyrrolidone, dimethylsulfoxide, tetrahydrothiophene sulfone, dioxane, tetrahydrofurane, or a mixture thereof. In an embodiment, each of these components, when included in the casting solution, can independently be about 10 to 50 or about 15 to 45 weight % of the casting solution. For example, dimethylacetamide can be about 15 to 40 or about 20 to 25 weight % of the casting solution. For example, tetrahydrofurane can be about 20 to 45 or about 35 to 40 weight % of the casting solution. For example, tetrahydrothiophene sulfone can be about 10 to 40 or about 15 to 20 weight % of the casting solution. For example, dimethylformamide can be about 15 to 40 or about 20 to 30 weight % of the casting solution. For example, dioxane can be about 10 to 40 or about 15 to 25 weight % of the casting solution. For example, dimethylsulfoxide can be about 10 to 40 or about 10 to 20 weight % of the casting solution.

In an embodiment, the casting solution can be disposed on the substrate using techniques such as doctor blade, spin coating, or slot nozzle. In an embodiment, the substrate can have a geometric shape so that the formed porous membrane can have a shape as described herein.

In an embodiment, the film is allowed to evaporate for a first period of time. The evaporation of the solvent starts the formation of the pores that extend throughout the porous membrane. The time allowed for evaporation is a variable that can be used to control the pore characteristics, such as those described above. In an embodiment, the first period of time can be about 1 to 60 seconds or about 5 to 20 seconds.

After evaporation, the film is immersed into a water bath for a second period of time to form the porous membrane. Immersion into the water bath solidifies the porous membrane. In an embodiment, the second period of time can be about 5 minutes to 24 hours or about 30 minutes to 2 hours.

Now having described the porous membrane and the methods of preparing the porous membrane in general, a specific embodiment will now be discussed. In an embodiment, PS-b-PEO can be used with tetrahydrofuran (THF), dimethylacetamide (DMAc) and tetrahydrothiophene sulfone (sulfolane) as solvents for the porous membrane preparation. Pure water was used as a coagulant bath (phase inversion medium) for the porous membrane formation. About 22 wt. % of PS-b-PEO polymer, about 38 wt. % of THF, about 22 wt. % of DMAc and about 18 wt. % of sulfolane was stirred for about 24 h at about 25° C. and the solution was cast on a substrate (e.g., a glass plate) using a doctor blade with 200 μm air gap. The substrate can be immersed after about 10 sec in a water bath maintained at about 24° C. The membrane can be kept in water for about 12 h and removed from water, washed with ethanol (or another appropriate alcohol) and air-dried. An integral asymmetric membrane can be formed with a selective isoporous top layer having pore sizes of about 20-30 nm and followed by sponge like sub-structure on the bottom of the membrane. The PS-b-PEO membrane showed a pure water flux of about 800 L m$^{-2}$ h$^{-1}$ bar$^{-1}$. The integrally asymmetric PS-b-PEO membrane obtained by the phase inversion technique showed good stability in water for a period of more than a week, based on the flux performance test. Based on the protein rejection measurements it was concluded that the membrane has molecular weight cut off of 110 kg/mol. Additional details and embodiments are provided in the following Examples.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Figure 2:
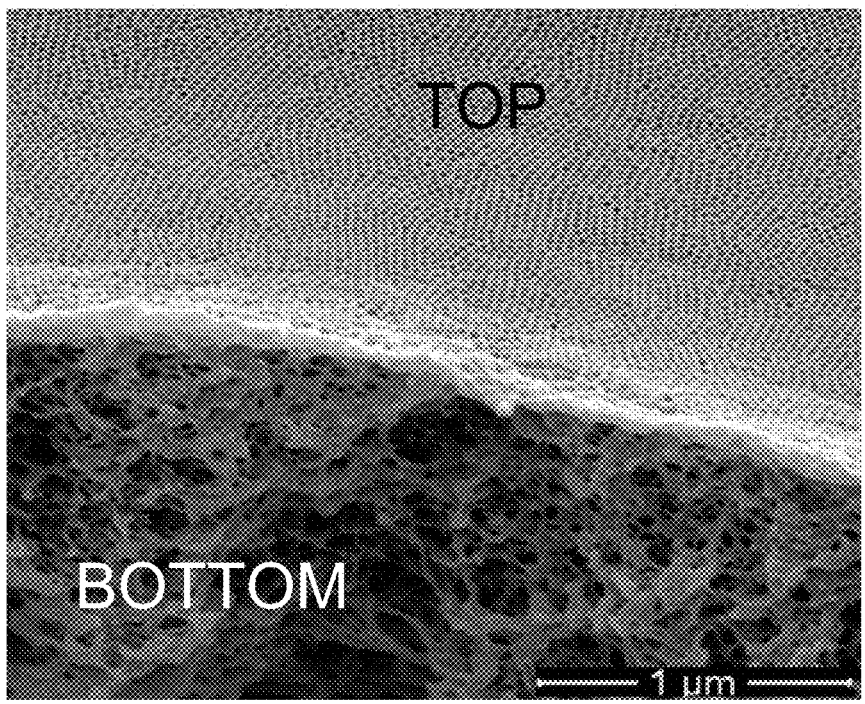
FIG. 2 is a SEM image of copolymer membrane (Cross section).
Figure 3:
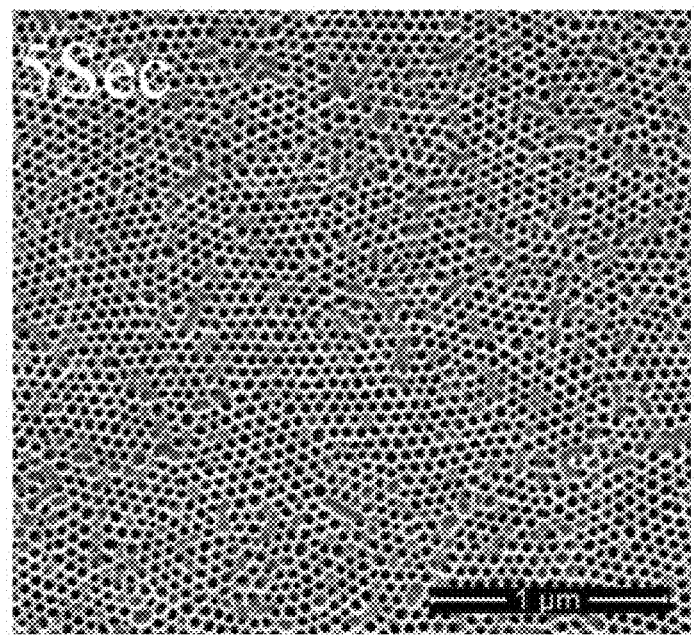
FIG. 3 is a SEM image of copolymer membrane at 5 s evaporation time (Top surface).
Figure 4:
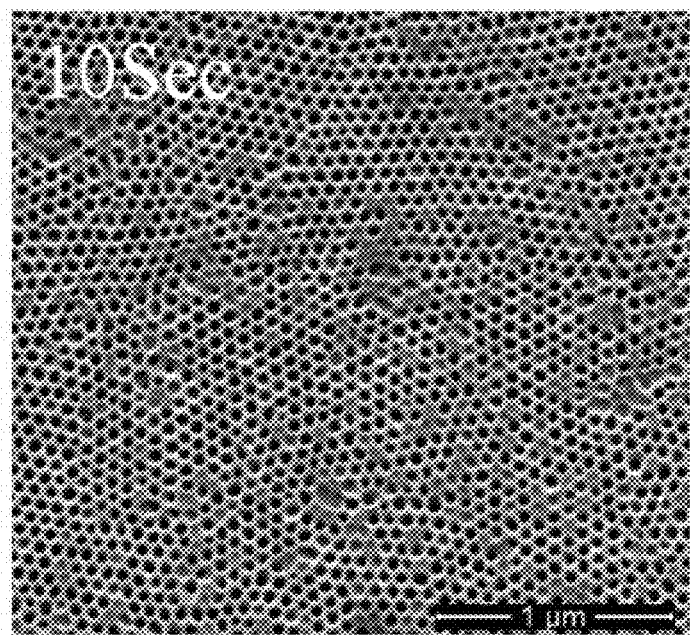
FIG. 4 is a SEM image of copolymer membrane at 10 s evaporation time (Top surface).
Figure 5:
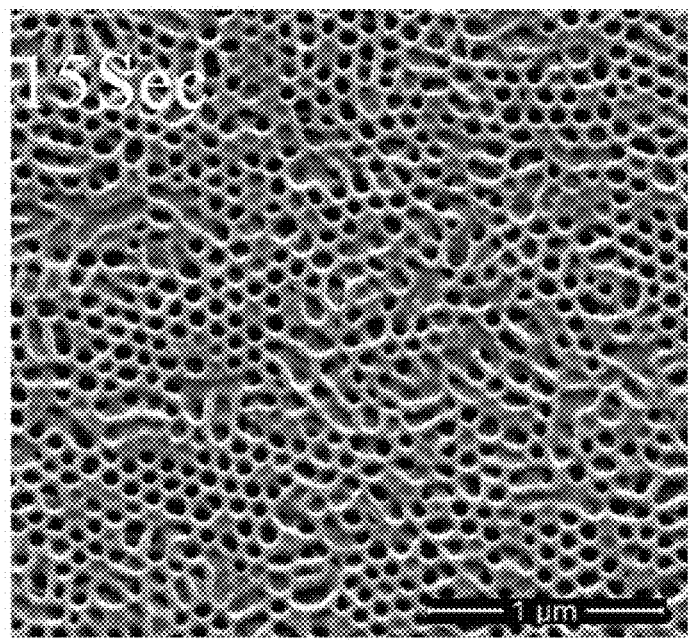
FIG. 5 is a SEM image of copolymer membrane at 15 s evaporation time (Top surface).
Figure 6:
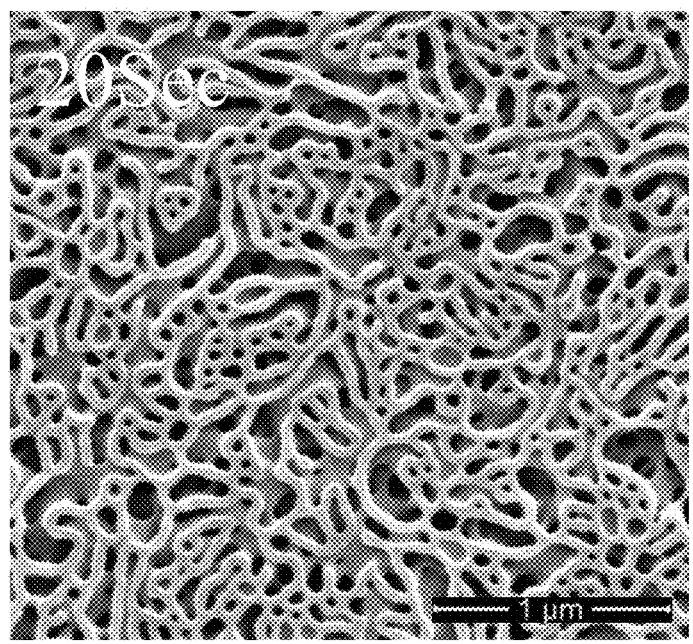
FIG. 6 is a SEM image of copolymer membrane at 20 s evaporation time (Top surface).

The block copolymer polystyrene-b-polyethylene oxide, (Polymer Source Inc.) is dissolved in a mixture of tetrahydrofuran, dimethylacetamide and sulfolane to provide a casting solution. The block copolymer had a molecular weight of 156 kDalton, and the molecular weight of the PS and PEO blocks were 138 kDalton and 18 kDalton respectively. Membranes were cast from solutions containing 22.2 wt. % of block copolymer, 37.8 wt % of THF, 22.2 wt. % of dimethylacetamide and 17.8 wt. % of sulfolane. The polymer solution was cast onto a glass plate using a casting knife with 200 μm air gap and immediately immersed in de-ionised water at room temperature. The polymer solidifies in water immediately and was kept in water for 3 hours and finally washed with ethanol and air dried. The top surface and cross-section of the block copolymer membrane produced is shown in FIGS. 1 and 2.

Example 2

A copolymer membrane is prepared using the methods of example 1 by varying the different evaporation time at 5 sec, 10 sec, 15 sec and 20 sec before coagulation in the water bath. The top surface of the block copolymer membrane prepared using different evaporation times is shown in FIGS. 3, 4, 5 and 6, respectively. Less than ≤10 sec evaporation time only produces the hexagonal cylinders on the top of membrane and above 10 sec evaporation leads to more collapsed pores on top of the membrane.

Example 3

Figure 7:
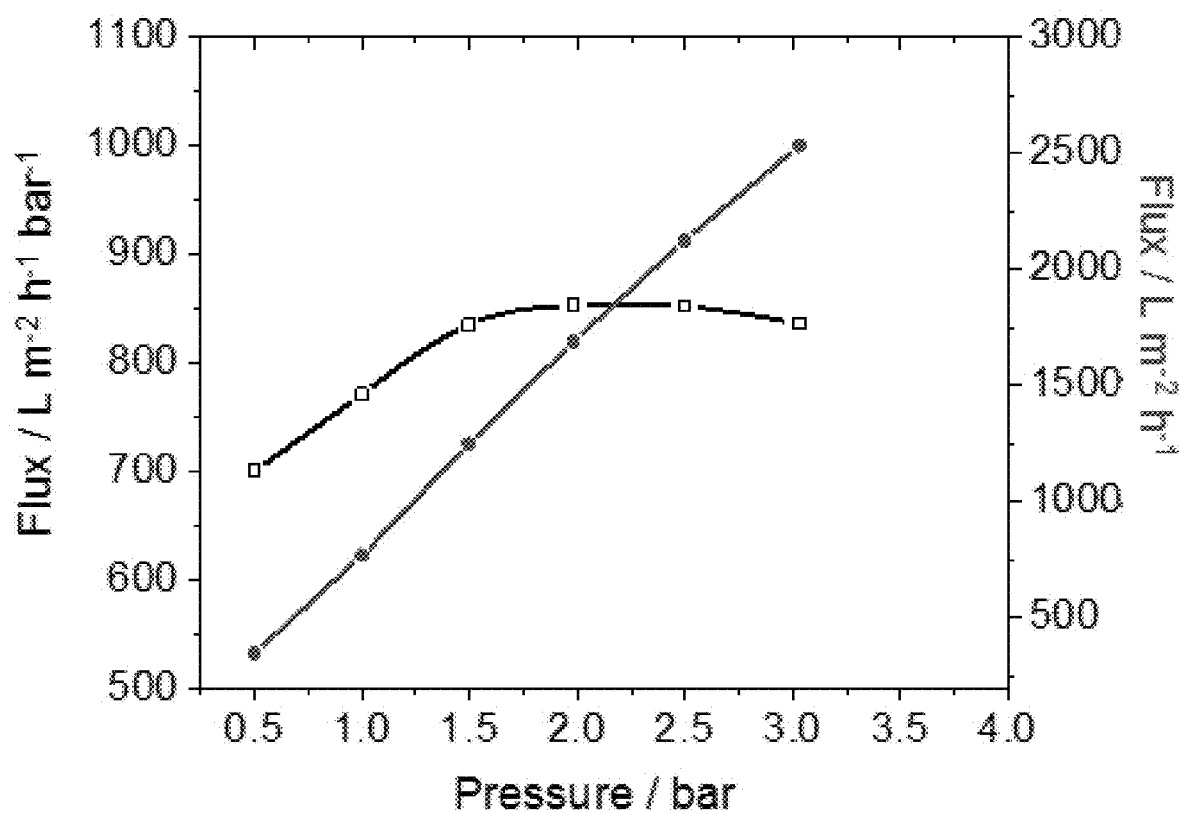
FIG. 7 is a graph of the water flux of the PS$_{138}$-b-PEO$_{18}$ membrane at various feed pressures.

Pure water flux was measured for the block copolymer polymer membrane prepared using the methods of example 1. The water fluxes (membrane testing area of ca. 5 cm$^2$) were tested in an Amicon cell at 0.5, 1.0, 1.5, 2.0, 2.5 and 3.0 bar. Water flux plotted against pressure is shown in FIG. 7. The water flux linearly increased with increasing pressure. The curve of water flux normalized by pressure as a function of pressure shows an initial increase and reaches a plateau for pressures higher than 1.2 bar. At 0.5 bar the water flux is 700 L m$^{-2}$h$^{-1}$ bar$^{-1}$ and flux at 1.5 bar is 820 L m$^{-2}$h$^{-1}$ bar$^{-1}$, gradually achieving steady state with water fluxes around 800-850 L m$^{-2}$h$^{-1}$ bar$^{-1}$.

Example 4

The molecular weight cut-off was measured for the membrane prepared using the methods of example 1, by filtering a mixture of polyethylene glycol (PEG) molecules of different molecular weights dissolved in water. The retention was monitored by gel permeation chromatography (GPC), by sampling the permeate and feed. It was found that the membrane has the molecular weight cut-off (MWCO) of 110 kg/mol (90% retention).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A structure, comprising:
a porous membrane made of polystyrene-b-polyethylene oxide (PS-b-PEO) copolymers having a polydispersity of about 1 to 1.2 and a polyethylene oxide content of 8 to 16 wt. %, wherein the porous membrane has periodically ordered surface pores formed by ordered cylindrical structures and having a long axis perpendicular to a surface of the porous membrane, wherein the porous membrane has a surface pore density of about $10^8$ pores/cm$^2$ or more.

2. The structure of claim 1, wherein the porous membrane is an integral asymmetric membrane.

3. The structure of claim 1, wherein the porous membrane is selected from the following: a flat sheet porous membrane, a tubular porous membrane, or a hollow fiber porous membrane.

4. The structure of claim 1, wherein the surface pores have a diameter of about 50 nm or less.

5. The structure of claim 4, wherein the porous membrane has a ratio of a maximum pore diameter $d_{max}$ to a minimum pore diameter $d_{min}$ of 2 or less.

6. The structure of claim 1, wherein the PS-b-PEO copolymer has a molecular weight of about 100 to 250 kDalton.

7. A method of making a porous membrane, comprising:
dissolving a PS-b-PEO copolymer in water miscible liquids to produce a casting solution, wherein the casting solution includes about 20 to 45 wt. % tetrahydrofuran, about 15 to 40 wt. % dimethylacetamide, and about 10 to 40 wt. % tetrahydrothiophene sulfone;
casting the casting solution on a substrate to form a film;
allowing the film to evaporate for a first period of time; and
immersing the film into a water bath for a second period of time to form the porous membrane.

8. The method of claim 7, wherein the first period of time for allowing the film to evaporate prior to immersion in water is about 1 and 60 seconds.

9. The method of claim 7, wherein the PS-b-PEO copolymer concentration in the casting solution is about 10 to 30 wt. %.

10. The method of claim 7, wherein the first period of time is about 5 to 20 seconds.

11. The method of claim 7, wherein the second period of time is about 30 min to 24 hours.

12. The method of claim 7, wherein the porous membrane is an integral asymmetric membrane.

13. The method of claim 7, wherein the substrate has a geometry to form the porous membrane that is selected from the following: a flat sheet porous membrane, a tubular porous membrane, or a hollow fiber porous membrane.

14. The method of claim 7, wherein the porous membrane has surface pores and a surface pore density of about $10^8$ pores/cm$^2$ or more.

15. The method of claim 14, wherein the surface pores have a diameter of about 50 nm or less.

16. The method of claim 7, wherein the porous membrane has a ratio of a maximum diameter $d_{max}$ to a minimum pore diameter $d_{min}$ is about 2 or less.

17. The method of claim 8, wherein the second period of time is about 30 min to 24 hours.

* * * * *